March 25, 1930.  J. W. MARTIN, JR  1,752,015
REFRIGERATING APPARATUS AND METHOD
Filed June 15, 1926   2 Sheets-Sheet 1
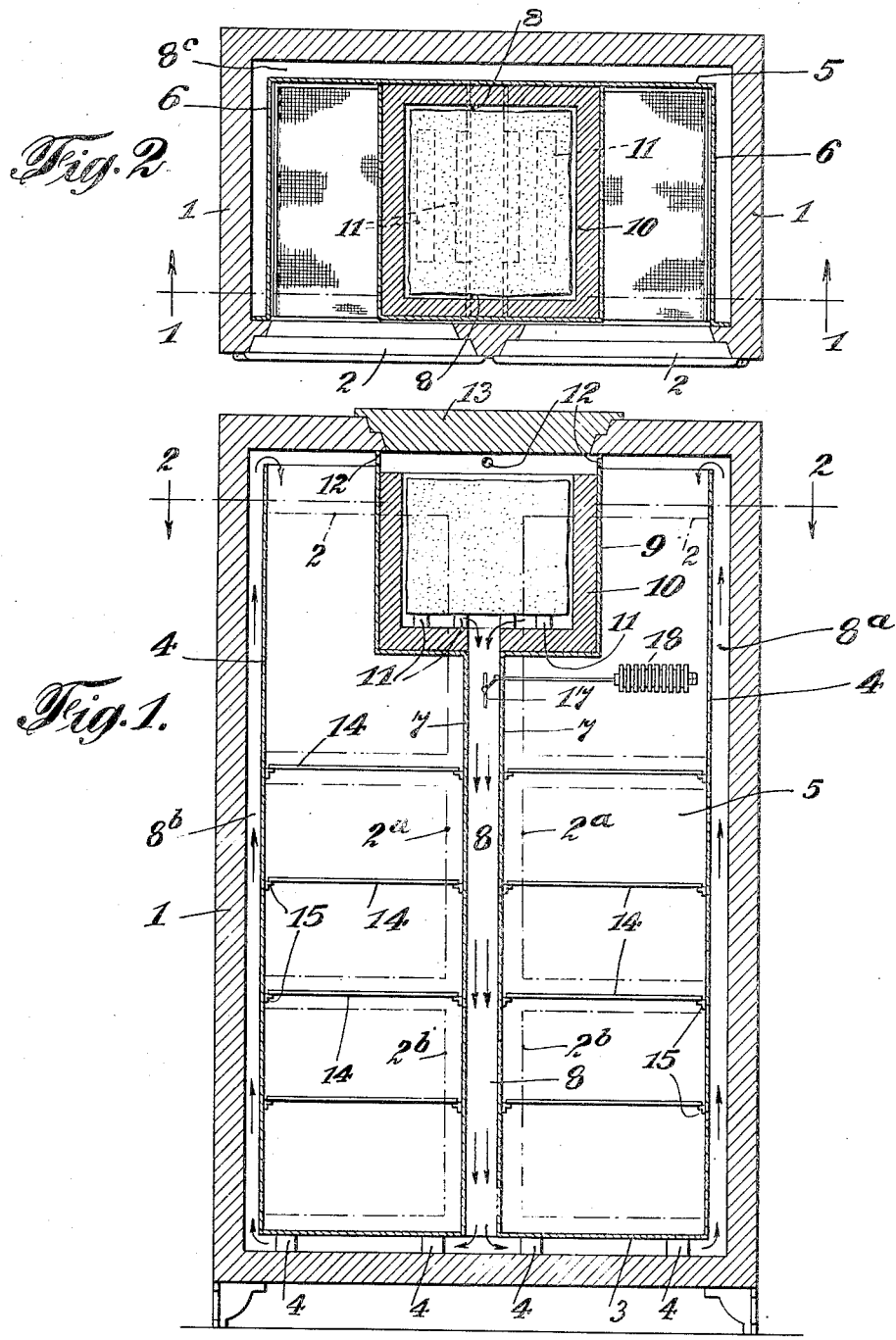

 
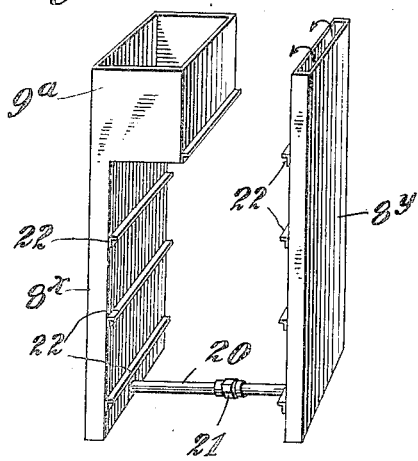 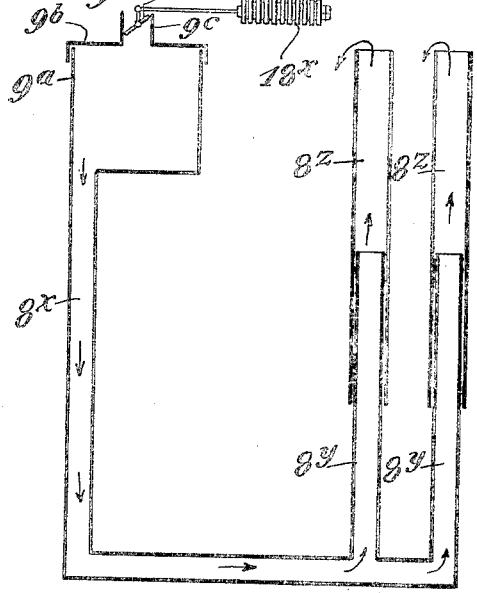
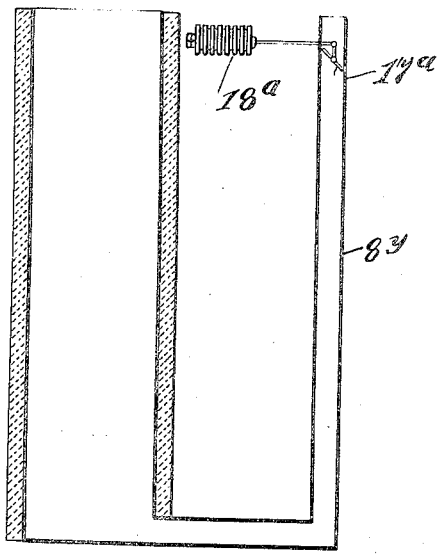 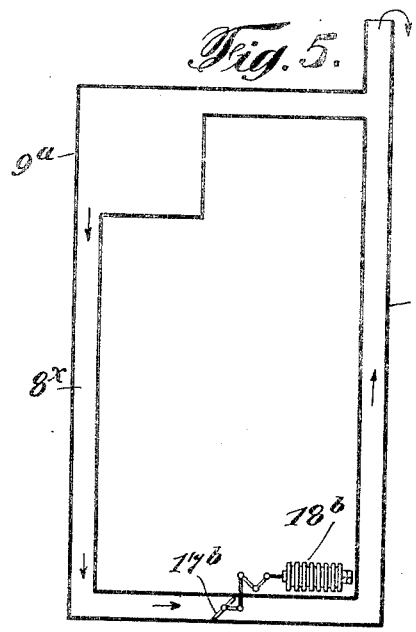
INVENTOR
James W. Martin Jr
BY
his ATTORNEY Patented Mar. 25, 1930

1,752,015

UNITED STATES PATENT OFFICE

JAMES W. MARTIN, JR., OF TUCKAHOE, NEW YORK, ASSIGNOR, BY MESNE ASSIGNMENTS, TO DRYICE EQUIPMENT CORPORATION, OF NEW YORK, N. Y., A CORPORATION OF DELAWARE

REFRIGERATING APPARATUS AND METHOD

Application filed June 15, 1926. Serial No. 116,103.

My present invention relates to methods of and apparatus for solving certain special problems presented by attempts to employ solid carbon dioxide for ordinary commercial refrigerating purposes. Commercially, solid carbon dioxide in relatively dense form is made either by freezing the liquid directly to the solid blocks or by expanding the liquid to so-called snow, which is then compressed into blocks of desired density. Among the unique factors involved in the use of such refrigerant are the following:

(1) The solid carbon dioxide melts or rather sublimates directly to a gas, without any intermediate state.

(2) The volume of the gas evolved is normally about 8 cubic feet per pound of the solid carbon dioxide, that is approximately 500 times the volume of the block where the block has a density of about 65 pounds per cubic foot.

(3) The temperature of the sublimated gas while nominally, approximately 114° F. below zero, may vary within wide limits above and below this temperature, which may be roughly indicated as somewhere between $-85°$ F. and $-140°$ F.

(4) This wide variation of temperature is the result of an accelerated or retarded sublimating rate, and while the temperature variation so caused is of utility and importance in my present invention, the acceleration and retarding of the sublimating rate and the factors controlling the same are of even greater importance.

(5) In considering these, heat insulation may be disregarded because it is well understand that the sublimating rate will be greater or less according as the heat insulation is greater or less.

(6) The present problems concern the active or dynamic factors of sublimating rate, which are:

(a) Convection of the heat by circulation of the air or gas within the refrigerated space;

(b) The enormously variable insulation afforded by the atmosphere within said space according as it is comprised mainly of the carbon dioxide gas or mainly of air.

(7) The unique factor in the control of accelerated or retarded melting rate is what is known as partial pressure. In an atmosphere of pure carbon dioxide gas, the rate of evaporation is minimized and the corresponding temperature of the gas may approximate the lower limit, whereas in a constantly maintained atmosphere of pure air, the melting rate is greatly accelerated and the temperature of the gas approaches the upper limit. That is to say, pure air has an effect similar to that of a perfect vacuum in accelerating the melting rate and any percentage admixture of air in a carbon dioxide atmosphere has an effect similar to that of a corresponding partial vacuum.

As related to the practical problems of my present invention, the object is to maintain a relatively pure atmosphere of carbon dioxide gas, for the double purpose of retarding the evaporation rate and maintaining high insulating value. This is accomplished by properly controlling the flow of the great volumes of gas per unit of solid that is evaporated, while at the same time gradually and diffusely applying refrigerated values of the fresh gas by conduction, to modify the temperature of the gas and prevent over-refrigeration upon discharge thereof into the refrigerated space.

One object of my invention is to establish a heat absorbing circuit of approximately pure gas, affording maximum insulation, adjacent exterior walls of the refrigerated space. A special feature is the arrangement of the heat absorbing and insulating circuit of said approximately pure gas to serially include a down-leg of circulation of the gas evaporated from the solid carbon dioxide, terminating in an up-leg in counterbalancing relation so that the down and up circuit functions as a heat absorbing thermostat. While the up-leg discharge into the outer air, as in one special form of my apparatus, it preferably discharges into the refrigerated space upon escaping from the thermostatic circuit; being relatively pure gas it flows down to the bottom of said space, displacing the air upward. The 500 volumes of gas per unit solid of the above density are thus most efficiently employed to expel air from the top of the refrigerated space. Obviously evaporation of a cubic foot of such solid would wash out a refrigerated space 2′ x 3′ x 4′, twenty-five or thirty times during the evaporation period.

An important practical point is that commercial refrigerating apparatus of all kinds is very apt to have leaks whereby the pure gas, being very heavy, is apt to drain out and unless the melting rate greatly exceeds the leaking rate, air will be drawn in at the higher level leaks. Any such inleak of air, even a small percentage, has a remarkable effect in decreasing the insulation value of the gas, but in the preferred form of my invention, this is compensated for by the phenomenal acceleration of gas evolution proportional to the percentage of air in the refrigerated space. This is one of the reasons why there there are certain advantages in having the gas overflowing from the up-leg of the circulation discharge into the refrigerated space, thereby tending to force air into the top of the space containing the solid carbon dioxide. Thus, under emergency conditions, the greater the amount of the relatively light, relatively non-insulating air, the more rapidly will gas be evolved to drive out that air.

By the above and other proper methods of utilizing the above described factors of commercial refrigeration of solid carbon dioxide, it has been demonstrated that the solid carbon dioxide, though having less than twice the refrigerant value of water ice, may be made to afford from ten to twenty or more times the refrigerating efficiency of the latter.

From the above it will be understood that my invention involves certain advantages never before attained in connection with carbon dioxide refrigeration as concerns modifying the temperature of the gas and applying its refrigerant value in such a way as to minimize danger of over-refrigeration of food and similar products within the refrigerator. Preferably, the carbon dioxide refrigerant is in a compartment in the top of the refrigerator, whence the heavy gas flows downward in a central conduit entirely within the refrigerated space. This downflow path is preferably the interspace between the walls of a central partition, which preferably extends from front to rear of the refrigerator and down to a bottom space, through which the gas flows laterally to and up through draft passages between the outer refrigerator shell, and the inner shell which encloses the refrigerated space. When the gas reaches the top of this interspace, it spills freely over into the food-containing body portion of the refrigerator, where it naturally settles downward through all of the compartments toward the bottom thereof, displacing warmer carbon dioxide or air upward. In this way, the inner metal shell is refrigerated by the primary down flow in the central partition and then is both refrigerated and heat-insulated by the countercurrent flow of gas in the exterior interspace between the inner shell and the exterior refrigerator casing. The primary downflow through the central partition takes effect entirely within and surrounded by the refrigerated space, while the flow across the bottom and up the sides and back operates to refrigerate and insulate the outer shell, with the very important advantage of also very substantially raising the temperature of the gas before it is discharged into the inner refrigerator space containing the products that are to be refrigerated.

While the upper compartment containing the solid carbon dioxide may be closed so that the above described circulation is forced by the pressure of the generated gas, the more specific claims of my present application contemplate leaving both the entrance and exit of the flow circuit vented to atmosphere within the refrigerator so that the circulation will be mainly static, that is to say, the gas is left free to spill over the top of the refrigerant chamber, but it does not do so because the down-column being naturally colder and more dense than the up-column will establish an unbalanced condition whereby the gas will be forced out from the top of the upflow column, until said upflow column becomes as cold as the downflow column. Moreover, the quantity of the flow will be automatically controlled by and in accordance with the difference in temperature between the downflow column and the upflow column, diminishing to zero when the up-column is as cold as the down-column and increasing to a maximum according as the up-column becomes warmer. Therefore, in normal operation, the carbon dioxide gas will not spill over the upper edge of the solid carbon dioxide containing compartment even through the latter be vented or entirely open. Moreover, when the above described thermostatic circulation is active, gas, with such percentage of air as has not been expelled from the top of the refrigerator, may be drawn downward into the solid carbon dioxide compartment, thereby accelerating the melting of the solid until the circulation is automatically checked by lowering temperature and by the increasing percentage of carbon dioxide gas, thereby increasing density of the up-column.

In actual practice, I find this automatic thermostatic control is so perfect that desired temperatures, above freezing, may be maintained in the ordinary domestic refrigerator merely by predetermining the amount and tightness of paper, pasteboard or other insulating wrappings for the solid carbon dioxide or for the walls of the refrigerant box. In this way, I have very satisfactorily operated a domestic refrigerator normally r quiring 75 pounds of water ice per day on 6 pounds of solid carbon dioxide per day.

Considering the counterbalancing downflow and upflow columns as an automatic self-controlling thermo-static instrument, it will be evident that further and more accurate adjustment for given ranges of temperature may be had by making the upflow column somewhat shorter than the downflow column, and it is even possible to make the upflow column somewhat higher than the downflow column, so that the gas will spill from the top of the upflow column only when the latter is very much warmer than the downflow column.

If design of the areas and cross-sections in combination with insulation is insufficient to secure a high enough maximum speed of circulation, I prefer to employ valves either in the down-column or the cross-connection of the up-column, controlled manually or by well known thermostatic elements, such as bi-metallic strips or metallic bellows tubes. The natural self-regulating quality of the counterbalanced columns may thus be subject to arbitrary control.

When thermostats are used the refrigerant melting of the solid may be controlled and determined, according to a fundamentally new method:

The upper part of the down-column containing the solid carbon dioxide is heavily insulated, but the solid therein is entirely uninsulated and a thermostatic valve is arranged to control downflow of the cold gas from the refrigerant in the down-column either by cutting it off entirely or limiting it to a small predetermined minimum. In this situation, the insulated walls plus the cold carbon dioxide remaining in the box and operating as effective insulation for the solid, will normally minimize melting, but whenever the thermo-static valve is open, this extremely heavy gas will fall rapidly in the down-column, drawing air into the top of the refrigerant box. I have discovered that such partial or complete substitution of air for carbon dioxide in contact with the solid has the remarkable effect of lowering its sublimating point from say $-110°$ F. to $-130°$ or $-140°$ F. and in this change in temperature a very considerable amount of carbon dioxide is evaporated. This plus the sensible heat of the air may increase the evaporation rate from say 5% or 10% up to say, 40% or 50% per 24 hours.

I believe I am the first to propose thus controlling the rate of melting of solid carbon dioxide, by controlling access of air directly with the solid.

While the arrangement of the down-flow column as a central partition in the refrigerator with two counterbalancing upflow columns in the outer walls, is a desirable arrangement, I find that it is entirely practicable to have only two columns, the downflow column being an outer wall of the refrigerator, the same as the upflow column.

While the above system may be built into a refrigerator, an important practical feature of my invention as disclosed herein is its adaptability for handy and inexpensive application to the interiors of ordinary ice refrigerators. For such purposes, the down-column with refrigerant box at the top thereof may be constructed in one piece, fitted against one side of the refrigerator chamber, and the up-column in another piece, fitting against the other side with a cross-connection in the bottom in the form of ordinary piping with detachable coupling.

The above and other features of my invention will be more evident from the following description in connection with the accompanying drawings, in which Figs. 1 and 2 are sections showing my invention as applied to a refrigerator of the domestic type, Fig. 1 being a vertical section on the line 1—1, Fig. 2, and Fig. 2 a horizontal section on the line 2—2, Fig. 1;

Fig. 3 is a perspective view showing a modified form of apparatus for the practice of my invention, adapted to be fitted into a domestic refrigerator of ordinary type;

Figs. 4, 5 and 6 are diagrammatic views of other modifications showing the paths of flow of the carbon dioxide gas and various points at which thermostatically controlled valves may be applied.

In Figs. 1 and 2, a domestic refrigerator of the upright type is conventionally indicated as comprising a box-like structure, 1, the walls of which are of any suitable heat insulating construction, having in the front face thereof upper doors, 2, 2, middle doors, $2^a$, $2^a$, and lower doors, $2^b$, $2^b$. In order to adapt such a box for operation in accordance with my present method, it is only necessary to fit therein a lining structure which may be of sheet metal, and sufficiently smaller than the interior of the box of the refrigerator, to leave the required upflow passages between said lining and the interior walls of said box. The lining structures may comprise a bottom, 3, resting on suitable supporting blocks, 4, parallel with the floor, a back, 5, parallel with the back of the refrigerator and sides, 6, 6, parallel with the sides of the refrigerator, with a central partition comprising spaced apart walls, 7, 7, providing a downflow passage, 8, leading from a solid carbon dioxide container, 9, which latter is preferably protected by wood or other insulating material, 10, in which the solid may be supported on blocks 11. The refrigerator may have a closely fitting removable section, 13, through which solid may be charged into the refrigerant box. The front edges of the side and bottom walls are preferably fitted airtight against the front of the refrigerator, as shown, so that the bottom, side and back interspaces will be practically tight. The down passage, 8, between the partition walls, 7, 7, is of course closed in both front and back, as is also the refrigerant container, 9. The operation of this arrangement shown in Figs. 1 and 2 will be evident from the drawings. The closure, 13, being removed, the block of solid carbon dioxide will be charged into the refrigerant box, 9, and the cover 13 closed. The article or materials to be refrigerated, specifically food products, will be placed upon shelves, 14, 14, resting on suitable ledges, 15, 15. The solid carbon dioxide having an extremely low melting point, or rather, sublimating point, approximately −110° F., will absorb heat from its surroundings and will gasify. The gas will circulate in the paths shown by the arrows, gravitating through the down passage, 8, flowing laterally and rearwardly at the bottom, then upward in the interspaces, $8^a$, $8^b$, and $8^c$, at the sides and back, ultimately flowing over the upper edge of the side walls, 4, and back wall, 5, into the refrigerating space where the perishable products are stored. The dry gas in the refrigerant box, 9, will speedily displace all air and the remarkable insulating effect of said gas will then be available to retard conduction or convection of the heat from the walls, 9, to the refrigerant. In larger boxes, such as are to be entered by the operator, the overflow gas may be discharged outside the building or may be returned to the top of box 9, but the latter requires a closed circuit excluding air from the solid at all times, as shown in Fig. 5.

As before described, the warmer the gas is in the up-passages, $8^a$, $8^b$, $8^c$, the more rapid will be the gravity downflow of the colder gas in 8. This gravity flow will tend to create a slight suction at the top of the refrigerant box, 9, and air will flow in at 12, 12 from the relatively warm refrigerator spaces, which may be approximately 35° above zero as against 110° below zero at which the solid evaporates. As explained above, very small amounts of such air will effectively accelerate evaporation of the refrigerant besides lowering the temperature, thereby greatly augmenting the supply of refrigerant flowing downward in 8. Obviously, however, such rapid flow of the cold fluid into the up-passages will speedily bring the temperature down and the weight up more nearly to the temperature and weight of the gas in down-column 8, thus automatically checking the circulation and permitting the refrigerant box, 9, to refill itself with pure carbon dioxide, with resulting great increase of insulation of the solid.

While the counterbalance of the up-column of gas against the down-column thus affords very effective thermo-static control of a closely graduated sort, much sharper control may be had by arranging a valve, 17, to partially or wholly close or open the downflow passage, 8. Such valve may be operated by hand or, as diagrammatically indicated in the drawings, by means of a thermostat, 18, of the well known metallic bellows type.

In the use of the refrigerator for ordinary household purposes, any one of the doors, 2, $2^a$, $2^b$, may be opened at any time. If an upper door, 2, is opened, only the carbon dioxide above the lower edge of that door opening can spill out and with the central partition as shown, only the gas on one side of the partition will spill. If the middle door, 2, is open, the corresponding compartment may be drained and if left open long enough, some, or even most, of the gas may leak out from the compartment above it. Similarly if a lower door, $2^b$, is opened, its compartment and also the middle and upper compartments above the same may also be drained. Drainage of upper compartments through lower doors may be minimized, however, by making the shelves of sheet metal, substantially fitting the cross-section of the chamber, their front edges fitting as closely as practicable the doors, in addition to the fit at the sides and edges.

Under all these conditions, and even if all of the doors be opened and the entire refrigerating space is drained, it is still impossible to unduly warm up the side and back walls, 4, 5, or the partition wall, 7, and there will be at all times a substantial volume of cold gas in contact therewith ready to reduce them immediately to standard low temperature, the instant the doors are closed and the walls can again work on a single body of confined atmosphere. Thereupon the refilling of the refrigerating space with carbon dioxide will proceed at a pace which will be accelerated in proportion to the amount of heat that was permitted to enter the refrigerating space while the doors were open.

It should be clearly understood that re-cooling by discharge of cold carbon dioxide into the refrigerating space to expel the warm air is far quicker and more effective than any method whatever that depends on abstracting heat from said air instead of expelling it.

A much simpler arrangement adapted for application to almost any refrigerant box of any size or shape is indicated in Fig. 3. Here the back wall of the interlining and the cross-flow beneath the floor are both eliminated, the refrigerating surfaces being limited to the sides of the space to be refrigerated, the apparatus comprising a sheet metal construction embodying the refrigerant box, $9^a$, and a thin, deep box member, $8^x$, the latter affording the downflow passage for the gas evaporated in the box 9. A corresponding flat box, $8^y$, of the same face area as $8^x$, $9^a$, is connected therewith by the bottom cross-flow pipe 20. This connection is made detachable by employing an ordinary pipe coupling, 21. The member 8$^x$, is fitted against one interior side wall of the refrigerator and 8$^y$ against the opposite wall. The pipe 20 will be of suitable length to hold them against their respective walls. When in position, the parts are connected for operation by screwing up coupling 21. The upright members are held against their respective walls, by pipe 20, acting as a distance rod, and at a higher level shelves on the ledges 22 serve the same function. Additional securing means may be employed if desired. As shown, the top of the refrigerant box, 9$^a$, and also the top of the member, 8$^x$, are both shown as open to permit the above described thermo circulation. If it is desired to have thermostatic control other than the inherent thermo counterbalance described above, a thermostat may be applied as shown in Fig. 1, at the outlet of the refrigerant box or, as diagrammatically indicated at 17$^a$, 18$^a$, in Fig. 4, at the outlet of the up-column, or, as shown at 17$^b$, 18$^b$, in Fig. 5, in the cross-connection between the columns. When the latter is desired for the arrangement shown in Fig. 3, a valve controlled by a thermostat may be inserted at the point where the coupling 21 is shown.

A specifically different method of thermostatic control, which has certain advantages, is indicated in Fig. 6. In this figure, the top of the refrigerant box, 9$^a$, is closed in by cover, 9$^b$, having an upstanding inlet, 9$^c$, adapted to be closed or opened by a balanced valve, 17$^x$, controlled by a bellows thermostat, 18$^x$. With this apparatus, gravity downflow in 8$^x$ cannot operate to suck in warm air at the top of the refrigerator box so long as 17$^x$ is closed. Consequently, the box is kept full of very cold highly insulating gas and evaporation is reduced to a minimum. In this situation, the circulation is so very slow that the up-column, 8$^y$, may become very warm without having any tendency to accelerate down circulation in 8$^a$, because 8$^a$ is in effect a barometric column sealed at the bottom by a U-bend of the conduit. Hence, the pressure differential takes effect merely as a suction on closed valve 17$^x$, at the upper end of said barometric column. In this situation, opening of valve 17$^x$, by thermostat 18$^x$, permits all the accumulated differential to operate instantly, the suction drawing in warm air through 9$^c$ to rapidly melt the solid carbon dioxide, and the accumulated cold gas flowing with corresponding rapidity downward through 8$^x$, across and up through 8$^y$, the other leg of the U, and from the top of 8$^y$ it flows down into the refrigerating space.

From the above, it will be evident that the preferred forms of my apparatus include a U-conduit arrangement affording counterbalancing columns of the carbon dioxide gas; that the refrigerant gas evolution being in one of said legs, preferably but not necessarily localized at the top thereof, there is a perpetual tendency of the column in said generator leg to overbalance the other column and cause outflow at the upper end thereof, even though the upper ends of both legs may be at the same level and both open to atmosphere. Furthermore, the bottom of the U-bend is like a water-sealed plumber's trap in that the heavy gas settling thereto by gravity from the generator leg, operates as a heavier fluid seal to prevent reverse flow or bubbling back of warmed gas or air from the other leg. Hence, the generator leg is characteristically a downflow leg discharging through the other leg which is therefore characteristically an upflow leg; and when the upper end of said generator leg is sealed as in Fig. 6, a substantial below-atmosphere condition may be then maintained, because of the heavy gas seal in the bottom of the U-conduit.

It will be evident that a very short up-leg 8$^y$, that is a J-shaped arrangement, would be effective for sealing the apparatus against reverse flow or bubbling back of lighter gas or air into the up-leg 8$^x$.

In referring to the above arrangements as U-type and J-type, it will be evident the relative cross-sectional areas of the legs and of the lateral connection between them are disregarded because it is a fundamental principle of fluids that the gravity pressures with resulting counterbalances or differentials between communicating columns, depend upon the vertical heights of the columns and specific gravities of fluid in said columns. Hence inherent thermo counterbalance control in Fig. 1 is the same in kind as in Fig. 3, although in Fig. 1 the horizontal cross-sectional area of the up-leg extending around three walls of the refrigerator may be approximately 4 times the cross-section of the down-leg 8, whereas in Fig. 3 these areas are approximately the same. The difference is, therefore, one of degree, the much greater heat absorbing surface of up-leg in Fig. 1 tending to keep the gas column in that leg proportionally warmer and therefore of less specific gravity.

From the above explanation of the broad principles of my method, it will be evident that it may be utilized in various specific forms of apparatus disclosing a vast number of specific variations as to horizontal sectional areas of the columns; conductivities and radiating rates of the upflow column, as determined by the materials of the walls thereof or the degree of insulation of said materials; and as to location and relative arrangement of the refrigerant containing box, the down-column and the up-column, each with reference to the other. In general, decrease of heat absorbing capacity of the down-column in any of the known ways, as by small cross-section or cylindrical cross-section or insulation will tend to great weight and low specific gravity of the down-column, and consequently to a lower temperature of the upflow or actively heat absorbing column, while great heat absorbing capacity for the up-column, as by highly conducting walls of great area as compared with the flow section, will promote activity of circulation. As a specific illustration, this principle would contemplate employing a pipe connection, like the pipe 21 in Fig. 3, extended upward so as to constitute the downflow column, as well as the crossflow column. Such a pipe could be used in place of the partition conduit 8 in Fig. 1. A unitary generator and radiator unit may consist of a down-leg tank such as shown in Fig. 4, protected on one or more sides or completely surrounded by insulation $x$ and said insulation may consist partly or wholly of an upflow leg. In Figs. 1 and 2, the upflow space, $8^c$, at the rear, may be omitted or may be partitioned from spaces $8^a$, $8^b$, thus making the latter two separate upflow legs each independently responsive to different heat conditions in the spaces on the respective opposite sides of partition 7, 7. In general, there may be as many separate or parallel connected up-legs and down-legs as may be desired.

In Fig. 6 I have diagrammatically indicated two upflow columns operating in parallel from the same source of carbon dioxide gas. Moreover, each of the up-conduits, $8^y$, is provided with a telescoping extension, $8^z$, whereby the height of said columns can be adjusted to the same level or to different levels, either above or below the level of the top of the refrigerant container.

I claim:

1. The method of refrigerating the interior of an insulated container, which includes evaporating therein a solid substance which evaporates without any intermediate liquid state, evolves hundreds of times its volume of gas much heavier than air, and which has its evaporation rate accelerated according to the percentage of air in bathing contact therewith; guiding and confining a circuit of downflow of the gas evaporated from said solid and upflow thereof through a counterbalancing column while conducting heat from refrigerated space into said gas and utilizing the upflow column as insulation for a wall or walls of said refrigerated space.

2. The method of refrigerating the interior of an insulated container, which includes evaporating therein a solid substance which evaporates without any intermediate liquid state, evolves hundreds of times its volume of gas much heavier than air, and which has its evaporation rate accelerated according to the percentage of air in bathing contact therewith; guiding and confining a circuit of downflow of the gas evaporated from said solid and upflow thereof through a counterbalancing column while conducting heat from refrigerated space into said gas, utilizing the up-flow column as insulation for said refrigerated space, and discharging gas overflowing from the top of the up-column into the refrigerated space, thereby displacing air in the latter.

3. The method of refrigerating the interior of an insulated container, which includes evaporating therein a solid substance which evaporates without any intermediate liquid state, evolves hundreds of times its volume of gas much heavier than air, and which has its evaporation rate accelerated according to the percentage of air in bathing contact therewith; guiding and confining a circuit of downflow of the gas evaporated from said solid and upflow thereof through a counterbalancing column while conducting heat from refrigerated space into said gas, utilizing the upflow column as insulation for said refrigerated space, discharging gas overflowing from the top of the up-column into the refrigerated space, thereby displacing air in the latter, and utilizing any remnant of air in the upper part of said refrigerated space to accelerate the evaporation rate of the solid by permitting free access thereof to said solid, under the action of said counterbalancing gas column.

4. In combination, a receptacle comprising a chamber to be cooled, a container in the upper portion thereof for solidified carbon dioxide, a downflow conduit from said container in heat exchange relation with said chamber, and an outlet conduit connected to said downflow conduit and extending upwardly, said conduits cooperating to control circulation of generated carbon dioxide gas.

5. In combination, a receptacle comprising a chamber to be cooled, a container in the upper portion thereof for solidified carbon dioxide, a downflow conduit from said container in heat exchange relation with said chamber, and an outlet conduit connected to said downflow conduit and extending upwardly, said conduits being in U-relation and cooperating to control circulation of generated carbon dioxide gas.

6. In combination, a receptacle comprising a chamber to be cooled, a container in the upper portion thereof for solidified carbon dioxide, a downflow conduit from said container, in heat exchange relation with said chamber, and an outlet conduit connected to said downflow conduit and extending upwardly to approximately the same level as the top of the container, said conduits cooperating to control circulation of generated carbon dioxide gas.

7. In combination, a receptacle comprising a chamber to be cooled, a container in the upper portion thereof for solidified carbon dioxide, a downflow conduit from said container in heat exchange relation with said chamber, and an outlet conduit connected to said downflow conduit and extending upwardly, said conduits cooperating to control circulation of generated carbon dioxide gas, one of said conduits constituting a wall of the chamber.

8. In combination, a receptacle comprising a chamber to be cooled, a container in the upper portion thereof for solidified carbon dioxide, a downflow conduit from said container, in heat exchange relation with said chamber, and an outlet conduit connected to said downflow conduit and extending upwardly, said conduits cooperating to control circulation of generated carbon dioxide gas, said conduits constituting walls of the chamber.

9. In combination, a receptacle having chambers to be cooled, a container in the upper portion thereof for solidified carbon dioxide, a downflow conduit from said container in heat exchange relation with said chamber, and an outlet conduit connected to said downflow conduit and extending upwardly, said conduits cooperating to control circulation of generated carbon dioxide gas, said downflow conduit constituting a partition wall between said chambers and said upflow conduit constituting an exterior wall or walls thereof.

10. In combination, an insulated receptacle comprising a chamber to be cooled, a container in the upper portion thereof for solidified carbon dioxide, a downflow conduit from said container in heat exchange relation with said chamber, and an outlet conduit connected to said downflow conduit and extending upwardly, said conduits comprising metallic walls for said chamber, and cooperating to control circulation of generated carbon dioxide gas.

11. In combination, a receptacle comprising a chamber to be cooled, a container in the upper portion thereof for solidified carbon dioxide, a downflow conduit from said container, in heat exchange relation with said chamber, and means for controlling the rate of evolution of gas from the solidified carbon dioxide in said container.

12. In combination, a receptacle comprising a chamber to be cooled, a container in the upper portion thereof for solidified carbon dioxide, a downflow conduit from said container, in heat exchange relation with said chamber, and means for controlling the rate of downflow of generated carbon dioxide gas comprising a valve in said downflow conduit and temperature responsive control mechanism therefor.

13. A method of controlling circulation of carbon dioxide gas generated from solidified carbon dioxide comprising guiding and confining the generated gas to form a closed circuit through a downflow static column and a communicating upflow counterbalancing static column.

14. A method of controlling circulation of carbon dioxide gas generated from solidified carbon dioxide comprising guiding and confining the generated gas to form a downflow static column and an upflow counterbalancing static column and regulating the rate of drainage.

15. A method of controlling generation of carbon dioxide gas from solidified carbon dioxide within a container, comprising guiding and confining downflow of the generated gas therefrom, and regulating admission of air to the container.

16. The method of refrigerating the interior of an insulated container, which includes evaporating therein a solid substance which evaporates without any intermediate liquid state, evolves hundreds of times its volume of gas much heavier than air, and which has its evaporation rate accelerated according to the percentage of air in bathing contact therewith; guiding and confining a circuit of downflow of the gas evaporated from said solid and upflow thereof through a counterbalancing column while conducting heat from refrigerated space into said gas and utilizing the generated carbon dioxide gas as insulation for a wall or walls of said refrigerated space.

17. The method of refrigerating the interior of an insulated container, which includes evaporating therein a solid substance which evaporates without any intermediate liquid state, evolves hundreds of times its volume of gas much heavier than air, and which has its evaporation rate accelerated according to the percentage of air in bathing contact therewith; guiding and confining a circuit of downflow of the gas evaporated from said solid and upflow thereof through a counterbalancing column while conducting heat from refrigerated space into said gas, utilizing the generated dioxide gas as insulation for said refrigerated space, and discharging gas overflowing from the top of the upcolumn into the refrigerated space, thereby displacing air in the latter.

18. The method of refrigerating the interior of an insulated container, which includes evaporating therein a solid substance which evaporates without any intermediate liquid state, evolves hundreds of times its volume of gas much heavier than air, and which has its evaporation rate accelerated according to the percentage of air in bathing contact therewith; guiding and confining a circuit of downflow of the gas evaporated from said solid and upflow thereof through a counterbalancing column while conducting heat from refrigerated space into said gas, utilizing the generated dioxide gas as insulation for said refrigerated space, discharging gas overflowing from the top of the upcolumn into the refrigerated space, thereby displacing air in the latter, and utilizing any remnant of air in the upper part of said refrigerated space to accelerate the evaporation rate of the solid by permitting free access thereof to said solid, under the action of said counterbalancing gas column.

19. A refrigerating apparatus comprising a container enclosing solidified carbon dioxide at a high level therein and conduit means defining a downflow path from the solid, discharging into an upflow conduit interposed between the refrigerated space or material and the external heat, whereby said upflow conduit affords a moving, continuously renewed insulating layer of carbon dioxide gas between the interior and the exterior of said refrigerated space.

20. Refrigerating apparatus including a container enclosing solidified carbon dioxide and means for confining and guiding gas evaporated from said solid, in heat exchange relation with a space or material to be refrigerated, said means including walls separating the downflow from the upflow and arranged so that the upflow is more exposed to exterior heat than the downflow.

21. A method of insulating and cooling a refrigerated space which includes placing solid carbon dioxide in heat exchange relation with said space and guiding and confining gas evaporated from the solid to maintain a continuously renewed, insulating layer of such gas interposed between the refrigerated space and the exterior.

22. A refrigerating apparatus including a chamber for products to be refrigerated, a container enclosing solidified carbon dioxide, separated from but in heat exchange relation with the refrigerated chamber and means for insulating as well as cooling said chamber including thin flat conduits arranged as walls of the refrigerated space and connected for continuous circulation of gas from the outlet of said container and to discharge said gas in operative relation for return flow into said container.

23. Refrigerating apparatus, including outer and inner containers formed and arranged to confine and permit circulation of gas between said containers, in combination with a container enclosing solid carbon dioxide arranged so that said solid may absorb heat derived from the inner container, and arranged for flow of the resulting dry cold gas between the containers thereby forming a continuously renewed insulation of dry gas interposed between and absorbing heat from said inner and outer containers; and a high level outlet to which said gas rises as it warms, and through which the excess gas may escape.

24. Refrigerating apparatus, including a container enclosing a space for products to be refrigerated and having walls arranged to afford insulating paths for circulation of insulating and cooling gas between the inner and outer surfaces of said walls, in combination with a container enclosing solid carbon dioxide arranged so that said solid may absorb heat derived from within the refrigerating space and arranged so that the resulting cold dry gas flows into said circulation paths, thereby maintaining a continuously renewed insulation of dry cold gas interposed between and absorbing heat from the refrigerated space and the exterior; and a high level outlet to which said gas rises as it warms, and through which the excess gas may escape.

Signed at New York, in the county of New York and State of New York this 14 day of June, A. D. 1926.

JAMES W. MARTIN, Jr.